Dec. 5, 1961  E. C. SEILS, JR  3,011,524
TAIL PIPE EXTENSION
Filed Jan. 17, 1958

INVENTOR.
Edward C. Seils, Jr.
BY
Harness, Dickey & Pierce
ATTORNEYS.

United States Patent Office 3,011,524
Patented Dec. 5, 1961

3,011,524
TAIL PIPE EXTENSION
Edward C. Seils, Jr., Racine, Wis., assignor, by mesne assignments, to Walker Manufacturing Company, Racine, Wis., a corporation of Delaware
Filed Jan. 17, 1958, Ser. No. 709,513
7 Claims. (Cl. 138—46.5)

My invention relates generally to sockets, connectors, and couplings and concerns an improved method of frictionally attaching such members to other members fitting within them. While the invention is not so limited, it has a particularly valuable application in tail pipe extensions.

It is an object of this invention to provide a tail pipe extension which is simple to assemble on the tail pipe.

Another object of the invention is to provide a tail pipe extension which will automatically center itself on the tail pipe.

Another object of the invention is to provide a tail pipe extension which is universal in the sense that it can be used on tail pipes of substantially different diameters or on pipes presenting poor surface conditions.

Another object of the invention is to provide a tail pipe extension that may be adjusted to different positions lengthwise of the tail pipe.

It is also an object of the invention to provide a tail tail pipe extension which is locked in place but which can be removed by forces properly applied.

Another object of the invention is to provide a tail pipe extension design which may consist of only one piece of material having no screws, springs, or other separate parts.

Another object of the invention is to provide a tail pipe extension which tends to absorb vibration and shock and to resist rattling or loosening.

It is also an object of the invention to provide a tail pipe extension which exerts radially directed pressure on the tail pipe that is substantially balanced around the circumference of the tail pipe.

It is also an object of the invention to provide a tail pipe extension having line contact with the tail pipe.

It is an object of the invention to provide a tail pipe extension which can be assembled and disassembled without any special tools.

It is a further object of the invention to provide a tail pipe extension which can be manufactured at a minimum cost and which can be made from scrap pieces of tubing.

It is also an object of the invention to provide a tail pipe extension which can be used more than once.

As indicated previously, the invention can be utilized in devices other than tail pipe extensions, hence the foregoing objects are applicable thereto and the accompanying drawings showing the invention embodied in a tail pipe extension are illustrative only of the principles of the invention.

Figure 1:
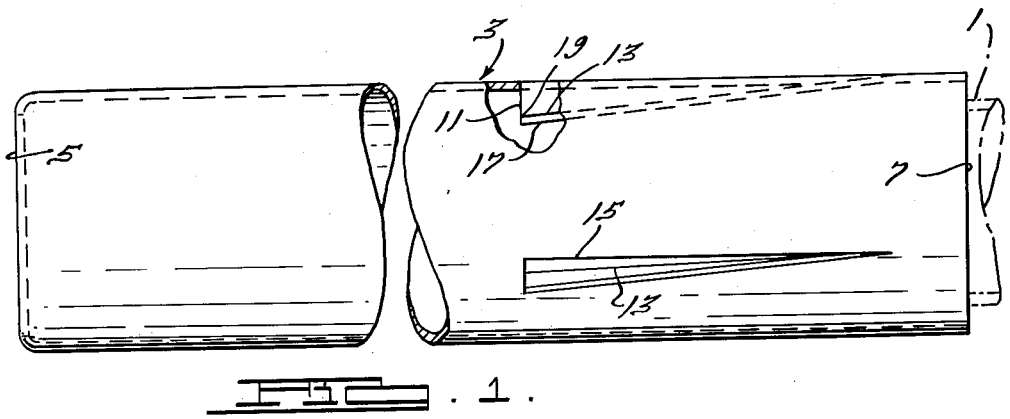
FIGURE 1 is a side elevation partly broken away of a simple form of tail pipe extension embodying the invention, the tail pipe being shown entering the tail pipe extension in phantom lines.

A tail pipe or other device to be received within the socket type connection or coupling of this invention is indicated in the drawings by the reference numeral 1. Attached to the tail pipe 1 is a member embodying the present invention in the form of a tail pipe extension 3. The extension 3 is a piece of cylindrical tubing having an outlet end 5 with an opening that is somewhat less in diameter than the I.D. of the tubing because of a turned in rim formed at the end of the tube. The inlet end of the extension has an opening 7 which is preferably of the same size as the I.D. of the tubing. This is somewhat larger than the diameter of the tail pipe 1 as can be seen in FIGS. 1–3.

In order to connect the extension 3 to and mount it on the tail pipe 1, a plurality of flaps 9 are formed in the wall of the extension 3 to extend radially inwardly and engage the outer surface of the tail pipe 1. Each flap 9 is preferably triangular in shape and is bent out from the wall of the tubing. The flaps are each formed by shearing along two sides of a triangle, preferably a right-angle triangle. The sheared sides or legs are identified by reference numerals 11 and 13. Each flap is folded along the base 15 of the triangle and is bent so that it makes an angle A which is preferably at least 45° with a tangent to the periphery of the tube at the base line 15. It will be noted that the base lines 15 of the triangles preferably run parallel to the axis of the extension 3 while the edges 17 extend axially but at an angle to this axis as well as to the wall of the tube. The sharp edges 17 of each flap engage the surface of the tail pipe 1 and the three sharp edges 17 together define a conical surface which is widest near the inlet end 7 of the extension and smallest toward the outlet end. This conical surface can expand radially inasmuch as the flaps 9 are transversely flexible and can yield resiliently in an outward direction by bending about their bases 15. The flaps 9 may also twist a little in the course of expansion when the extension 3 is forced upon a tail pipe 1.

Figures 2, 3:
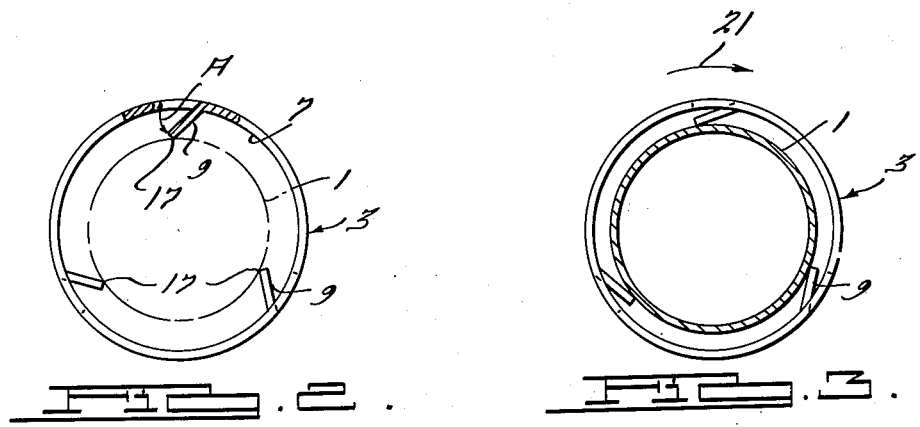
FIG. 2 is an end elevation partly in section taken from the right of FIG. 1.
FIG. 3 is an end elevation with a tail pipe inserted in the extension and shown in section.

It is apparent from FIGS. 1 to 3 that the tail pipe extension 3 can be applied by simply forcing it on the tail pipe 1. This is done by inserting the tail pipe in the opening and using suitable instruments, such as a piece of wood and a brick, to tap the tail pipe extension 3 in a longitudinal direction onto the pipe 1. When this is done the outer end of the tail pipe 1 will engage the sharp corners 17 of the flaps at points along the lengths of the flaps which depend upon the diameter of the pipe 1. Additional axial pressure on the extension 3 will result in expansion of the conical surface defined by the lines 17 which is accommodated by bending and twisting of the flaps 9. The sharp edges 17 dig into the surface of the tail pipe 1 and provide a tight grip on it. When the extension 3 has been moved axially to the desired position, the flaps 9 will automatically hold it locked in place against any undesired movement relative to the pipe 1 and it will not be possible to directly pull the extension 3 off the tail pipe 1 because the heels 19 of the flaps 9 will dig into the surface of the pipe and act as ratchet teeth to prevent removal. However, if it is desired to remove the extension 3, this can be done by simultaneously turning it in the direction of the arrow 21 in FIG. 3 and pulling it off the pipe 1, it being evident that no tools are necessary for this operation.

Figure 4:
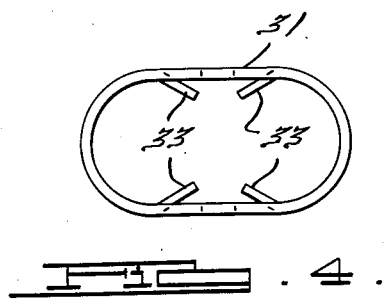
FIG. 4 is an end elevation of a different form of extension cross section.

FIG. 4 shows a modified type of tail pipe extension embodying the invention. In this extension the body 31 is oval in shape. There are four flaps 33 extending into the hollow interior of the extension. These flaps are of the same construction as the flaps 9 and will function in a similar manner to mount the extension upon and secure it to a suitable tail pipe.

It will now be realized that I have provided an extremely simple type of connection between an outer member and an inner member. Insofar as tail pipe extensions are concerned, the invention provides a very inexpensive design which can be mounted upon and properly centered on various size tail pipes and on tail pipes having various surface conditions. The sharp line contact between the resilient flaps and the tail pipe enable the flaps to dig in and provide a firm grip on the tail pipe that resists relative movement. The flaps 9, being resilient, provide a means for absorbing shock and vibration. The length of contact along the flaps 9 is substantial and prevents non-axial canting of the extension on the pipe. Since the flaps 9 are resiliently deformed they will spring back into the original position when the tail pipe extension is removed so that the extension can be used again. Obviously, the unit can be assembled and disassembled without any special tools; and, in fact, nothing but hand pressure is needed for removal.

It is apparent that modifications can be made in the specific structure that has been illustrated herein. For example, the unit of FIG. 3 could be a part of a more elaborate design of tail pipe extension; or the unit could be used for applications other than tail pipe extensions.

I claim:

1. In a tail pipe extension, a tubular member, a plurality of flaps formed in the wall of the tubular member, said flaps each being triangular in shape with the base thereof integral with said wall and the other two sides sheared from said wall, said flaps being deformed inwardly at an angle to said wall and having inner edges defining an expandable conical surface.

2. A tail pipe extension comprising a tubular member having a wall to fit over a tail pipe, mounting members formed integrally with the wall of the tubular member and extending inwardly therefrom to engage the outer surface of the tail pipe, said mounting members having inner sharp edges, each said edge extending lengthwise of the member and different points along each said edge being spaced varying distances from the wall of the member.

3. The invention set forth in claim 2 wherein said edge also extends at an angle to the axis of the member.

4. An attachment to be mounted on an inner member, said attachment comprising a tubular member having a wall to receive within it the inner member, said tubular member having flaps struck inwardly from the wall thereof, said flaps being substantially triangular in shape, said triangular shape being substantially in the form of a right angle having a base extending parallel to the axis of the tubular member and lying in the surface of the wall thereof, the other two sides of said triangles being sheared to provide the edges of the flap, the hypotenuse of said right triangle extending axially of the tubular member with the apex end thereof at the inlet end of the attachment.

5. A connection between transversely spaced members comprising a plurality of transversely flexible wedges in the space between the members engaging one member along lines parallel to a line of reference and engaging the other member along lines extending angularly to said line of reference, said wedges being flexible so that they are transversely movable about said parallel lines as axes toward and away from the respective members.

6. A connection between concentric radially spaced cylindrical surfaces comprising a plurality of flexible wedges of varying radius located in the space between the surfaces and disposed to define planes tangent to a cylindrical surface of smaller diameter than the inner of said surfaces and substantially concentric therewith, said wedges being flexible in directions normal to said tangent planes and extending lengthwise of said surfaces.

7. An attachment to be mounted upon an inner member, said attachment comprising a tubular member including an outer wall, bendable flaps extending in from said wall at an angle thereto and extending lengthwise of the tubular member, said flaps being bendable around axes extending lengthwise of the tubular member, said flaps each having an inner edge extending lengthwise of the tubular member and adapted to engage and grip the inner member, said tubular member being removable from an inner member by pulling and turning it relative to the inner member.

References Cited in the file of this patent

UNITED STATES PATENTS

| | | |
|---|---|---|
| 1,374,307 | McKissick | Apr. 12, 1921 |
| 1,391,495 | Parsons | Sept. 20, 1921 |
| 2,087,178 | Zaiger | July 13, 1937 |
| 2,509,503 | Huyton | May 30, 1950 |
| 2,750,963 | Bond | June 19, 1956 |
| 2,873,988 | Bartholomew | Feb. 17, 1959 |

FOREIGN PATENTS

| | | |
|---|---|---|
| 1,126,301 | France | July 23, 1956 |